(12) United States Patent
Melton et al.

(10) Patent No.: US 9,027,712 B2
(45) Date of Patent: May 12, 2015

(54) ADAPTABLE PLATFORM FOR LOADING AND UNLOADING RAILWAY CARS

(71) Applicant: Aluminum Ladder Company, Florence, SC (US)

(72) Inventors: Allan J. Melton, Timmonsville, SC (US); Allyn Thomasson, Darlington, SC (US); Rodrick Williamson, Hemingway, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 34 days.

(21) Appl. No.: 13/919,506

(22) Filed: Jun. 17, 2013

(65) Prior Publication Data

US 2014/0367195 A1    Dec. 18, 2014

(51) Int. Cl.
*B65G 69/22* (2006.01)
*E04G 1/34* (2006.01)
*E04G 5/14* (2006.01)

(52) U.S. Cl.
CPC ........ *B65G 69/22* (2013.01); *E04G 1/34* (2013.01); *E04G 5/14* (2013.01); *E04G 5/141* (2013.01)

(58) Field of Classification Search
CPC ........ B61K 13/00; B65G 69/22; B66F 11/04; E04G 5/14; E04G 5/141; E06C 7/16
See application file for complete search history.

(56) References Cited

U.S. PATENT DOCUMENTS

| | | | | |
|---|---|---|---|---|
| 4,679,657 A * | 7/1987 | Bennett et al. | ................ | 182/113 |
| 5,042,612 A * | 8/1991 | Bennett et al. | ................... | 182/1 |
| 5,392,878 A | 2/1995 | Bennett et al. | | |
| 6,502,267 B2 | 1/2003 | MacDonald et al. | | |
| 7,140,467 B2 | 11/2006 | Cook | | |
| 7,216,741 B2 * | 5/2007 | MacDonald et al. | ......... | 182/113 |
| 7,832,525 B2 * | 11/2010 | Bennett et al. | ................. | 182/36 |
| 7,950,095 B2 | 5/2011 | Honeycutt et al. | | |
| 8,015,647 B2 * | 9/2011 | Bennett | ............................. | 14/37 |
| 8,051,951 B2 * | 11/2011 | Bennett et al. | ................. | 182/39 |
| 8,261,393 B2 | 9/2012 | Honeycutt et al. | | |
| 8,341,821 B2 | 1/2013 | Honeycutt | | |
| 8,387,191 B2 * | 3/2013 | Honeycutt | ........................ | 14/36 |
| 8,403,109 B2 * | 3/2013 | Bennett | ........................ | 182/131 |
| 8,479,882 B2 | 7/2013 | DuBose et al. | | |
| 8,479,884 B2 | 7/2013 | Mizell et al. | | |
| 8,561,239 B2 | 10/2013 | Honeycutt et al. | | |
| 2012/0006619 A1 * | 1/2012 | DuBose et al. | ............... | 182/113 |
| 2012/0042458 A1 * | 2/2012 | Bennett et al. | ................. | 14/71.3 |
| 2012/0045274 A1 * | 2/2012 | Mizell et al. | .................... | 403/330 |
| 2012/0048648 A1 * | 3/2012 | Meacham | ..................... | 182/113 |
| 2013/0015016 A1 * | 1/2013 | Honeycutt | .................... | 182/113 |
| 2013/0219790 A1 | 8/2013 | Honeycutt et al. | | |

* cited by examiner

*Primary Examiner* — Alvin Chin-Shue
*Assistant Examiner* — Colleen M Chavchavadze
(74) *Attorney, Agent, or Firm* — Dority & Manning, P.A.

(57) ABSTRACT

An apparatus that provides selectively deployable worker access with fall protection to at least a portion of the top of a container disposed above the ground. A gangway and its associated fall protection cage are selectively deployable from an elevated platform over the top of the container. The gangway and its associated cage are slidably connected to the platform via a track carried along the side of the platform.

16 Claims, 7 Drawing Sheets

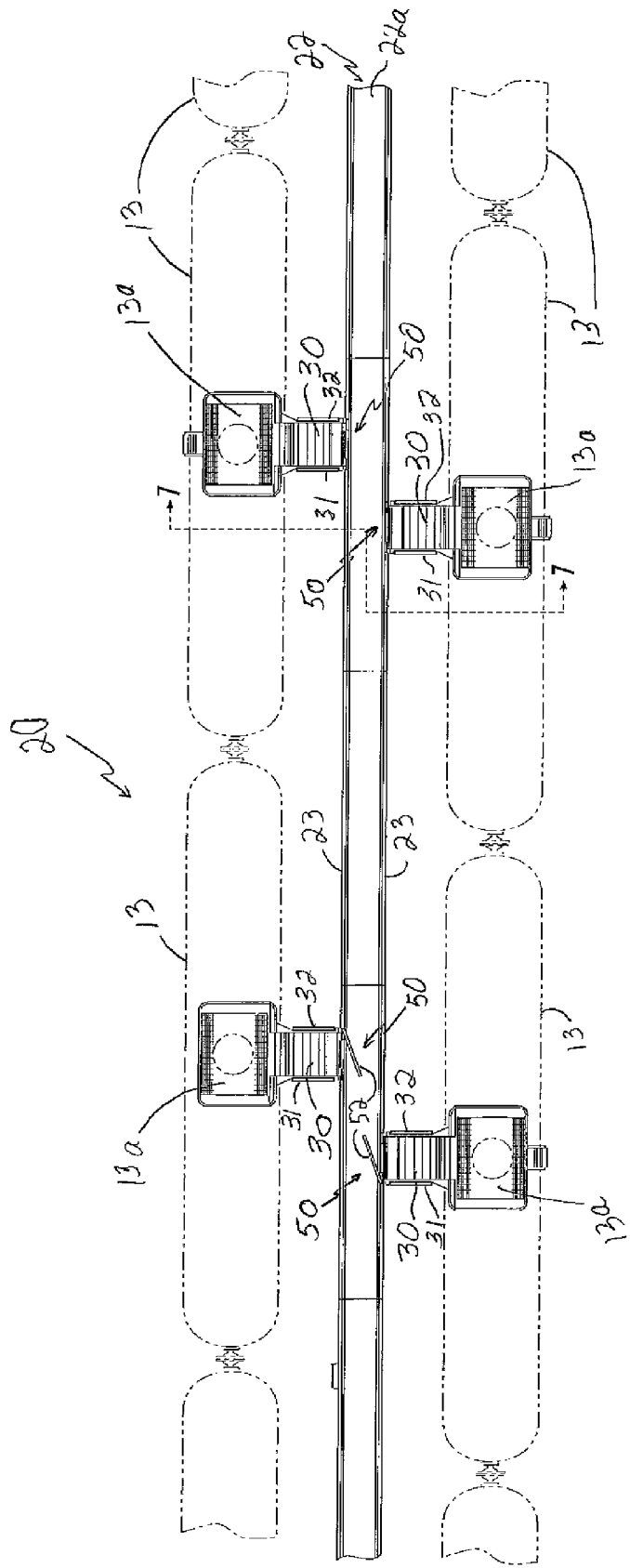

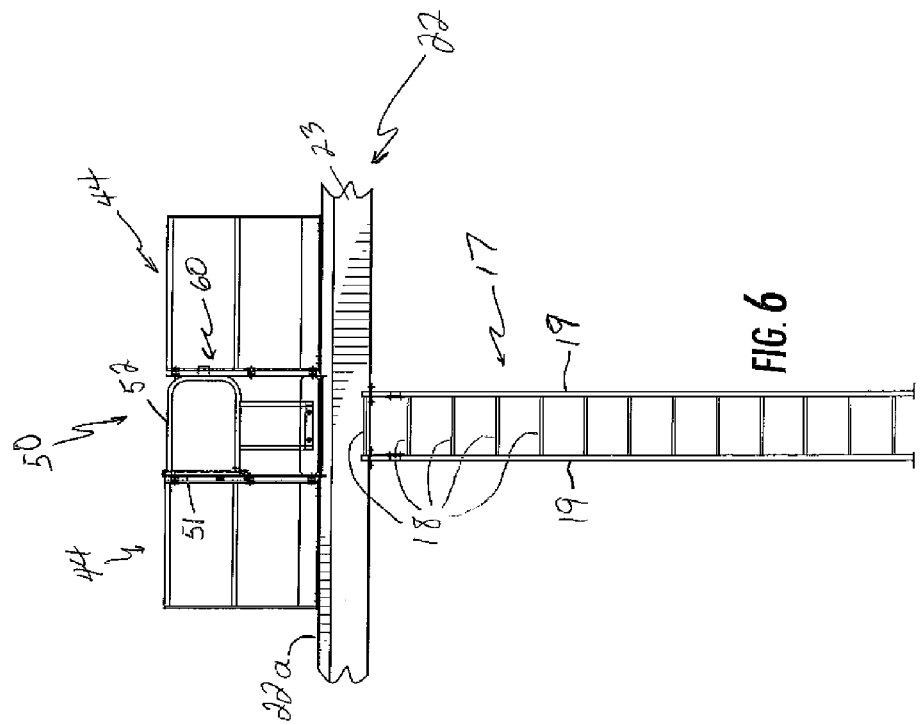
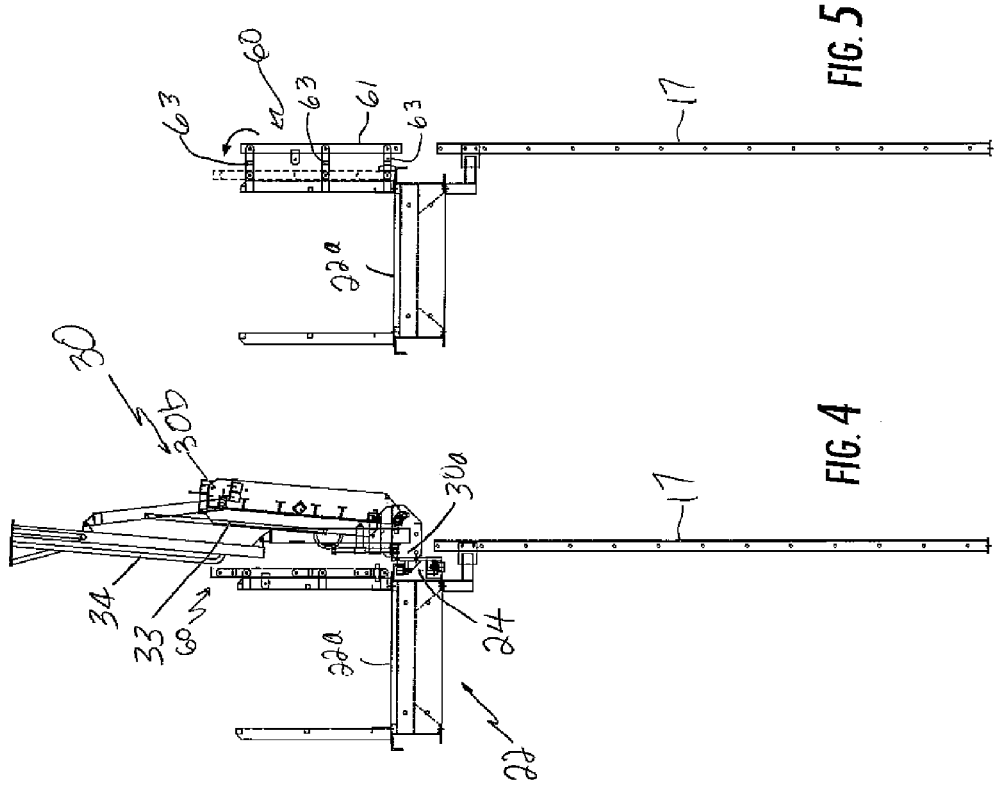

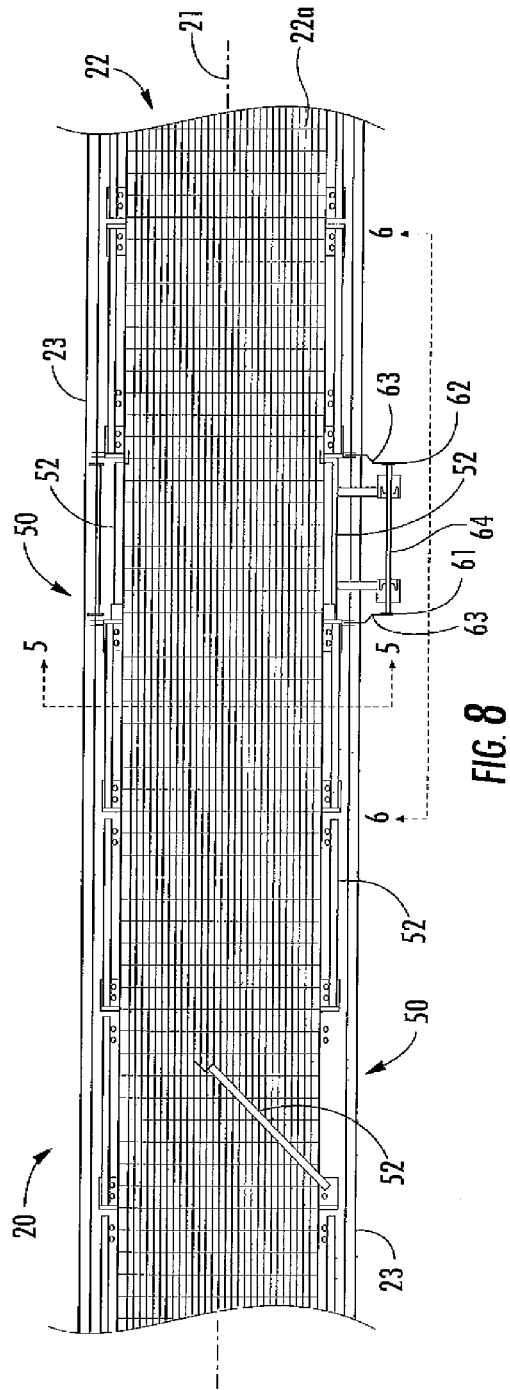
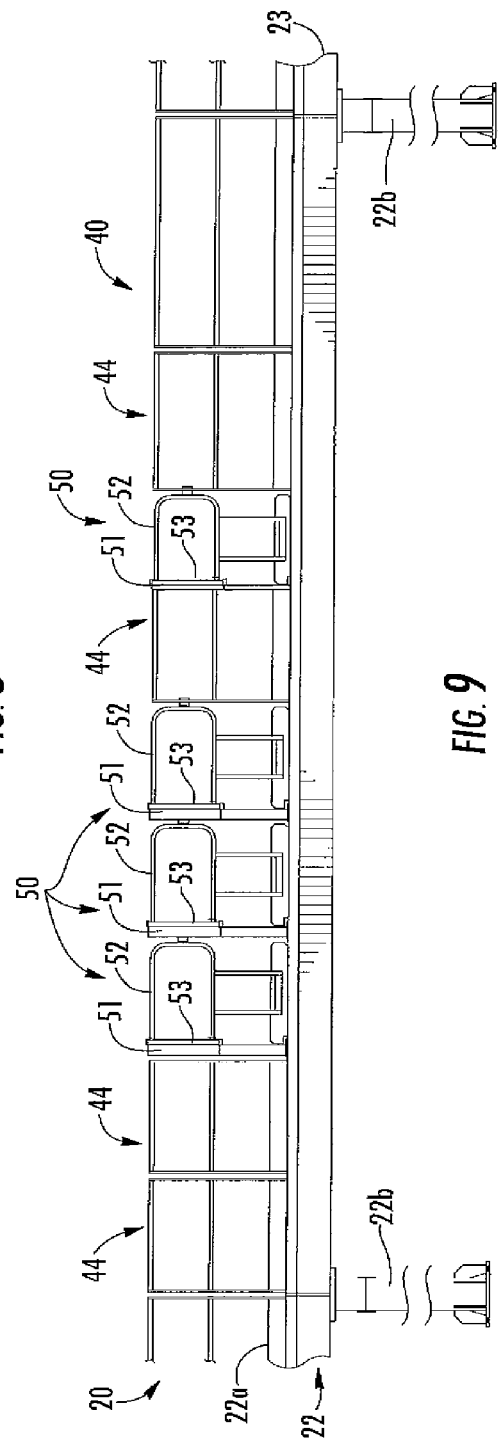

ADAPTABLE PLATFORM FOR LOADING AND UNLOADING RAILWAY CARS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The subject matter disclosed herein generally involves elevated platforms for accessing the tops of rolling stock for purposes of loading and unloading same, and particularly fall protection equipment provided for such elevated platforms.

BACKGROUND OF THE INVENTION

Long strings of railway tank cars are often pulled alongside of elevated platforms for the purpose of loading or unloading the contents of the tanks. These car strings usually are left coupled together, and the tops of the tanks carried by the cars generally need to be accessed by workers. This worker access typically is effected via a fold-down ramp or gangway. In accessing the tops of rolling stock (tank trucks, tank railroad cars, etc.), a gangway is lowered from the elevated platform to allow workers to move cargo between the platform and the top of the rolling stock. These gangways include cantilevers that usually carry a protective enclosure (aka cage) added to the outboard end to provide fall protection while the worker is on top of the rolling stock. Examples of these gangways are disclosed in U.S. Pat. Nos. 4,679,657; 5,042,612; 5,392,878; 7,140,467; 7,216,741 and 8,015,647, the disclosures of which being hereby incorporated herein for all purposes by this reference.

Because of variations in the lengths of railway tank cars, variations in the configurations of the tops of railway tank cars and operator error in positioning the railway tank cars relative to the platform, the gangways often are mounted on tracks that enable the gangway to slide along the length of the platform and thereby assume different positions with respect to the tops of the railway tank cars. An example of a track-mounted gangway is disclosed in U.S. Patent Application Publication No. 2012-0045274, the disclosure of which being hereby incorporated herein for all purposes by this reference.

Depending on how the string of cars is spotted, the length of track required to position the gangways along the length of the elevated platform can become quite large. The string of railway transport cars is usually spotted from one end of the string of cars or from the middle of the string of cars. The farther the car is from the spotting origin, the longer the length of track that the gangway must traverse in order to become properly positioned to allow the worker to access the top of the tank.

A self-closing gate provides access to the gangway when the gangway is moved opposite the opening to the car. Currently, side rails with the gates are bolted or welded on at specific locations of the elevated platform based on current anticipated needs. However, changes in lengths of cars and car configurations can result in additional track being needed than what was originally allowed for. Additionally, the relative locations of the self-closing gates and the fixed sections of side rail on each side of the platform may need to be changed in order to accommodate the different lengths of cars and different car configurations.

Emergency ladders often are used on these long platforms, and each emergency ladder is provided with its own self-closing gate that in turn provides access to the ladder from the elevated platform. Thus, to accommodate the different lengths of cars and different car configurations, the relative locations of the emergency ladder and its associated self-closing gate also may need to be changed so that it does not block movement of the gangway along the track in the platform.

If changed circumstances require reconfiguring the locations of each gangway and its self-closing gate as well as any emergency ladders and associated self-closing gate along the length of the elevated loading platform, effecting these changes poses problems of disassembly and re-assembly and the time and man-hours associated with completing these tasks.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which:

FIG. 3 is a top plan view of an embodiment of an elevated platform with track mounted, modular gangways and gates for worker access to the tops of tanks (shown in dashed outline) carried by railcars.

FIG. 4 is a side plan view of an elevated platform with track mounted, modular gangways and gates for worker access to the tops of tanks carried by railcars disposed in alignment with a selectively retractable guide railings for an emergency ladder.

FIG. 5 is a side plan view taken in FIG. 8 along the sight lines of the arrows designated 5-5 of an elevated platform for worker access to the tops of tanks carried by railcars and with selectively retractable guide railings for an emergency ladder schematically shown in a deployed and retracted (dashed line) configuration.

FIG. 6 is a front plan view taken in FIG. 8 along the sight lines of the arrows designated 6-6 of an embodiment of components of an elevated platform for worker access to the tops of tanks carried by railcars with an emergency ladder and gate.

FIG. 8 is a top plan view similar to that taken in FIG. 3 of components of an embodiment of an elevated platform with modular side railings and gates for worker access to the tops of tanks (not shown) carried by railcars.

FIG. 9 is a front plan view of an embodiment of components of an elevated platform with modular side railings and gates for worker access to the tops of tanks (not shown) carried by railcars.

Figure 1:
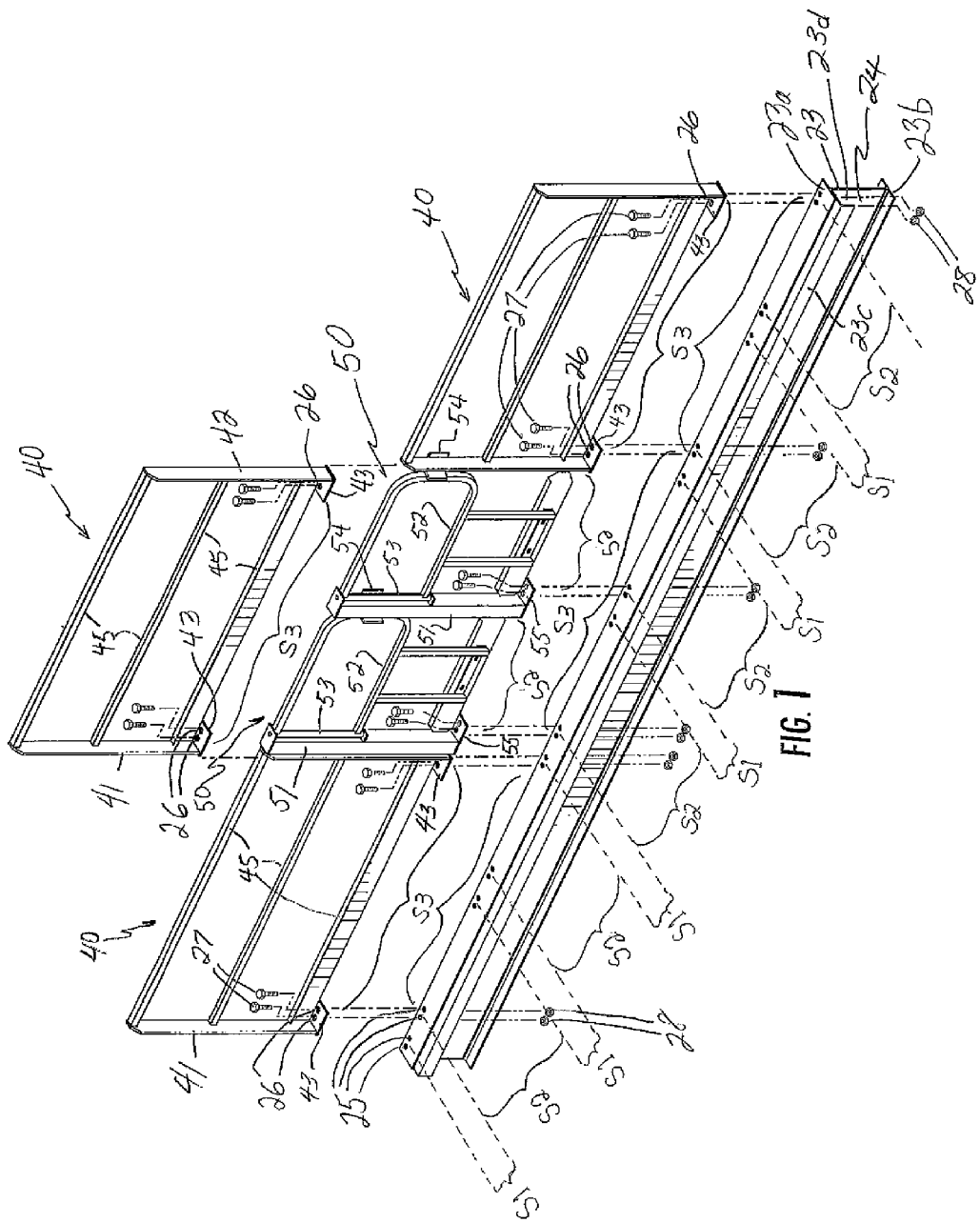
FIG. 1 schematically presents a perspective view of an embodiment of a system of interchangeably deployable, modular rails and gates for an elevated platform for worker access to the tops of tanks carried by railcars.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

The longitudinal direction extends along the length of a structure, and the length of an elongated structure is the longest dimension of the structure. The transverse direction extends perpendicular to the longitudinal direction along the width of a structure, and the width of an elongated structure is the shorter orthogonal dimension of the structure. The vertical direction typically is the orthogonal direction that is normal to both the transverse direction and the longitudinal direction and typically is parallel to the direction in which the force of gravity would tend to operate when the apparatus in question is being used for its intended purpose.

When one structure is selectively attached to another structure or selectively connected to another structure, it means that the two structures are attached or connected at the option of the user and thus can be separated from one another at the option of the user without damaging the two structures and without damaging the fastening elements that were used to effect the connection or attachment between the two structures. Similarly, when one structure is detachably attached to another structure or detachably connected to another structure, it means that the two structures are attached or connected at the option of the user and thus can be separated from one another at the option of the user without damaging the two structures and without damaging the fastening elements that were used to effect the connection or attachment between the two structures. Typically, in both of these cases, the two structures can be reused repeatedly, and the fastening elements can be reused repeatedly as well.

An embodiment of the apparatus 20 of present invention that includes an elevated platform 22 for worker access to the tops 13a of tanks 13 carried by railcars in accordance with the present invention is depicted from different vantage points in each of FIGS. 3 and 7-9 for example. More detailed aspects of embodiments of various components of embodiments of the elevated platform 22 are shown in FIGS. 1, 2, 4-6 and 10 for example. As explained more fully below, because of the modular nature of some of these various components, different combinations of them can be made within the scope of the present invention so that one embodiment of one component may be combined with another embodiment of the same or a different component to yield a still further embodiment of the present invention.

As noted above, some embodiments of the apparatus 20 of the present invention may include an elevated platform, which is schematically represented by the element designated by the numeral 22 in FIG. 3 for example. As shown in FIGS. 3 and 7-9 for example, the apparatus 20 desirably includes an elevated platform 22 that extends in a longitudinal direction and is defined in part by a deck 22a. As shown from a head on view in FIG. 7 and from a side view in FIG. 9, the deck 22a of the elevated platform 22 typically is supported and suspended above the ground by a plurality of rigid legs 22b that are the elongated, underlie the platform 22 and carry same. These rigid legs 22b desirably may be formed from steel girders for example and are conventional in the art.

Some components of embodiments of the apparatus 20 of the present invention can be retrofitted to platforms 22 that already exist. However, unlike conventional elevated platforms in which the fixed railings and swing gates are welded permanently to the platform, the apparatus of the present invention permits non-destructive disassembly and detachable reassembly of these elements to the platform in order to accommodate repositioning of the swinging gates and the fixed railings in different arrangements and so permit worker access to different rail car configurations (especially regards the relative positioning of the loading hatches for the rail cars) as well as different rail train configurations (different rail cars connected successively in a different order in the train for example).

Figure 10:
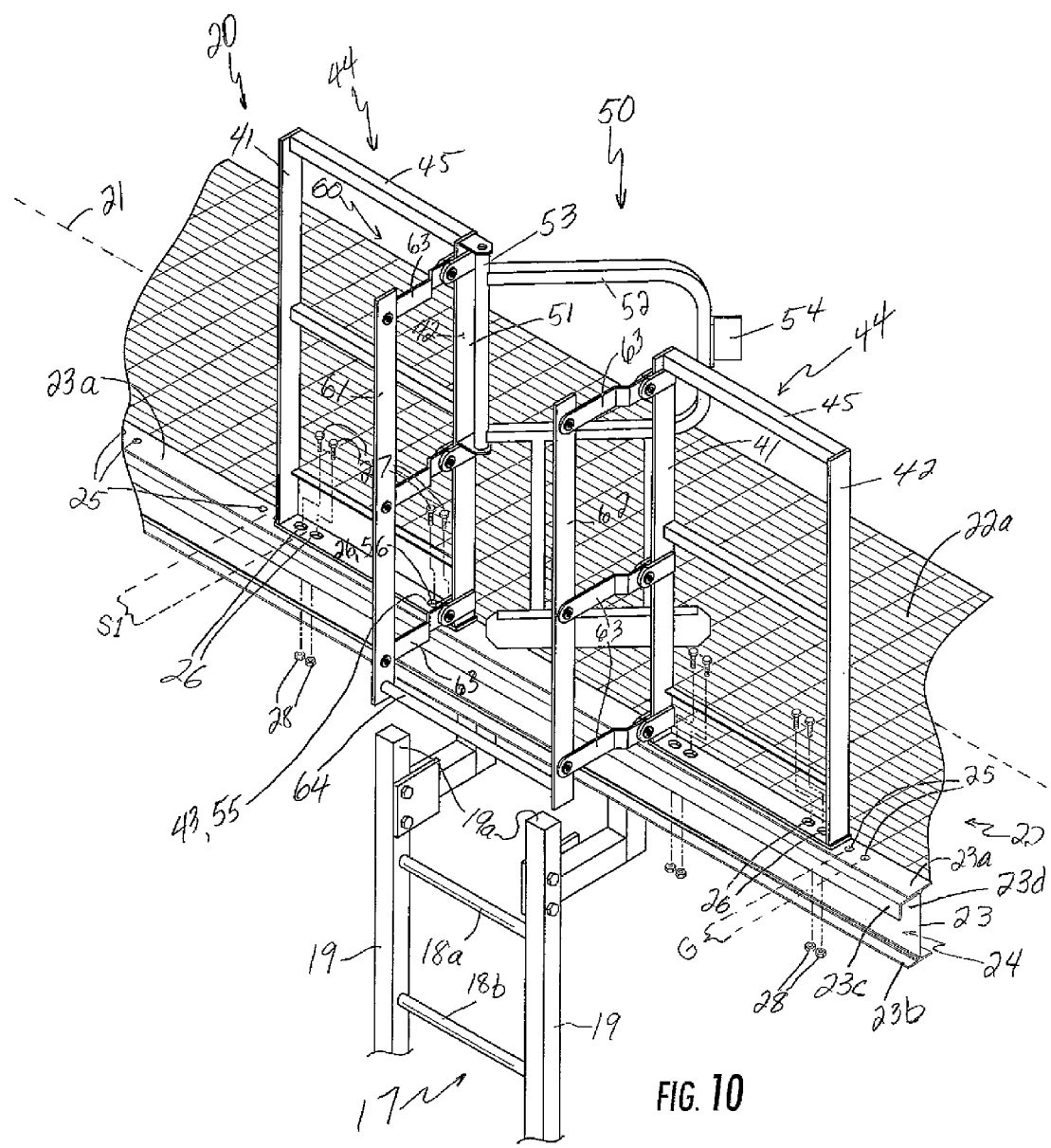
FIG. 10 is an isometric view of embodiments of components of an elevated platform for worker access to the tops of tanks carried by railcars with an emergency ladder and gate.

As schematically shown in FIGS. 3 and 8 for example, the deck desirably has a pair of longitudinally extending sides that are separated apart from one another in the transverse direction, which is the direction that is normal to the virtual centerline 21 shown in dashed line in FIG. 8 for example. As shown in FIG. 8 for example, each side of the deck 22a desirably is disposed to a respective opposite side of a virtual longitudinal centerline 21 that extends down the length of the platform 22 and is oriented normal to the transverse direction. As shown in FIGS. 8 and 10 for example, the deck 22a desirably is formed by steel decking that is rated to support the types of loads that are anticipated where the apparatus 20 will be installed.

Figure 2:
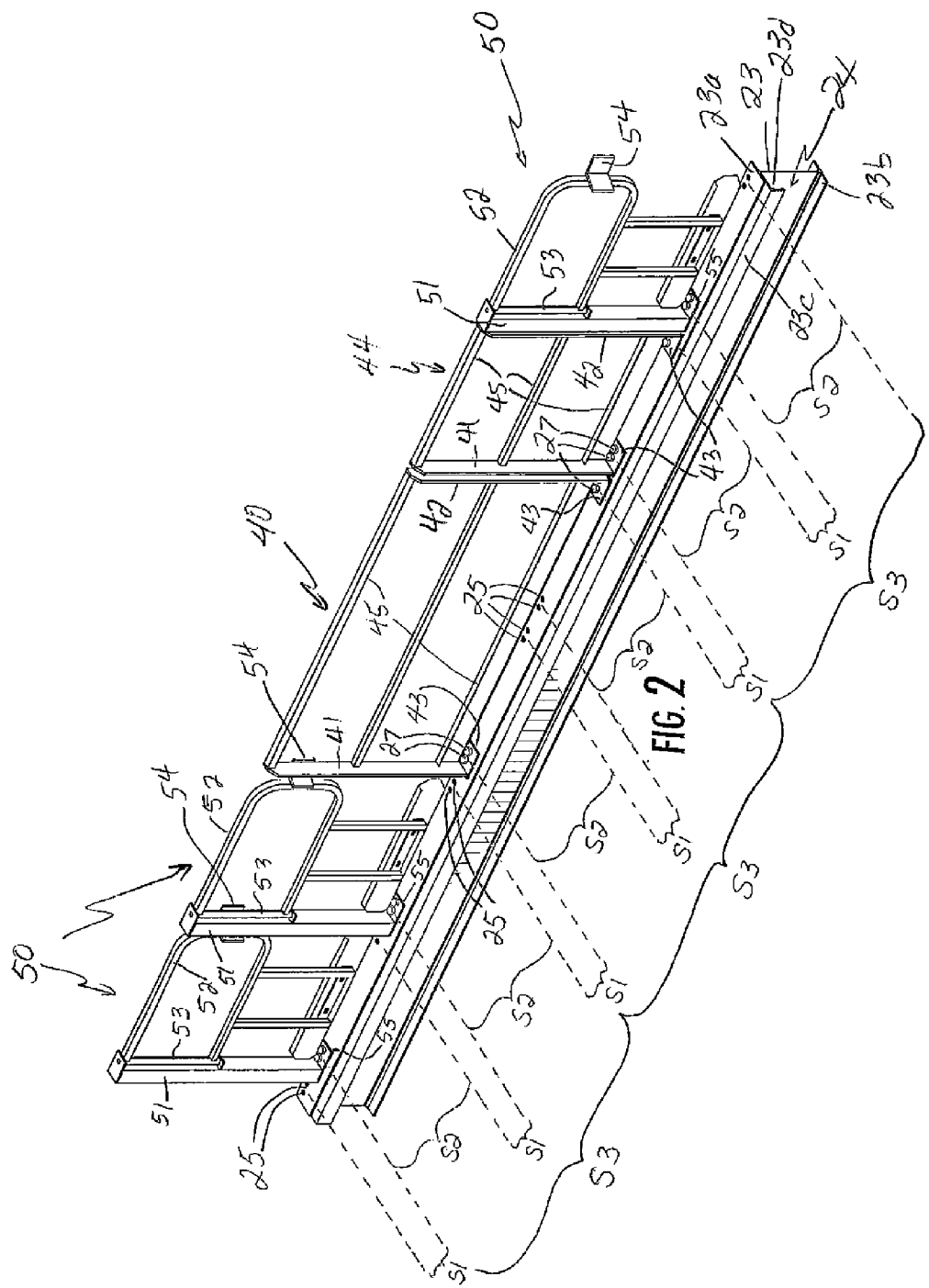
FIG. 2 schematically presents a perspective view of an alternative arrangement of an embodiment of a system of interchangeably deployable, modular rails and gates for an elevated platform for worker access to the tops of tanks carried by railcars with an alternative disposition of gates shown in dashed outline.

As schematically shown in FIGS. 3 and 8 for example, the apparatus 20 desirably includes a pair of longitudinally extending stringers 23 that form the opposite sides of the platform. As shown in FIG. 3 for example, a first stringer 23 is disposed along one side of the deck, and a second stringer 23 is disposed along the opposite side of the deck. FIGS. 1 and 2 illustrate an individual section of a modified metal I-bar that forms a section of an individual longitudinally extending stringer 23. As shown in FIG. 1 for example, each stringer 23 defines an upper flange 23a that extends along the length of the stringer 23 and extends generally in the transverse direction. Moreover, each stringer 23 further defines a lower flange 23b that is spaced vertically apart from the upper flange 23a. The lower flange 23b extends along the length of the first stringer 23 and also extends in the transverse direction. As shown in FIG. 10 for example, the upper flange 23a of each stringer 23 defines a depending lip 23c that extends along the length of the stringer 23 and extends generally in the vertical direction from the upper flange 23a a short distance toward the lower flange 23b to form one side of a three-sided channel 23d. As shown in FIGS. 1, 2 and 10 for example, the upper and lower flanges 23a, 23b of each stringer 23 form part of a trackway 24 that includes the channel 23d and extends along the length of each respective stringer 23 and thus extends longitudinally down each side of the deck 22a.

Figure 7:
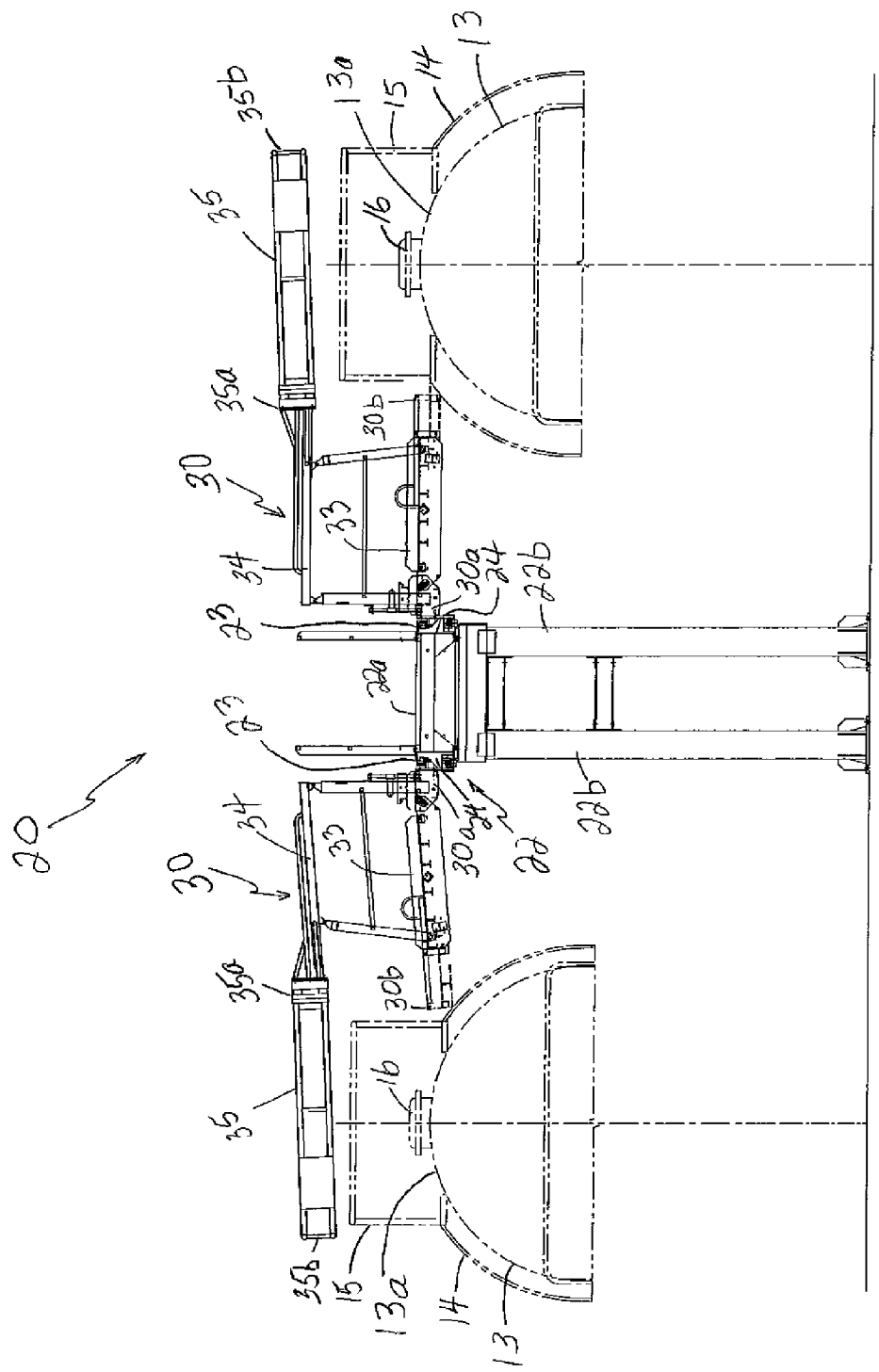
FIG. 7 schematically presents a view taken in FIG. 3 along the sight lines of the arrows designated 7-7 of an embodiment of components of an elevated worker platform with track mounted, modular gangways and gates for worker access to the tops of tanks (shown in dashed line) carried by railcars.

As embodied herein and indicated generally by the numeral 30 in each of FIGS. 3, 4 and 7 for example, the apparatus 20 desirably includes at least a first gangway 30, and desirably a plurality of gangways 30 such as shown in FIGS. 3 and 7 for example. As shown in FIGS. 4 and 7 for example, each gangway 30 has an inboard end 30a that is configured to be constrained within the trackway 24 of one of the stringers 23. As shown in FIG. 7 for example, the inboard end 30a of each gangway 30 is pivotally connected to the platform 22 and configured to slidably move along and generally within the trackway 24 of one of the stringers 23. The manner of effecting the configuration of the inboard end 30a of the gangway 30 so as to be slidable within the constraints of the first trackway 24 is conventional and disclosed for example in commonly owned U.S. Patent Application Publication No. 2012-0045274, the disclosure of which being hereby incorporated herein for all purposes by this reference.

As shown in FIGS. 4 and 7 for example, each gangway 30 also includes an outboard end 30b that is spaced apart from and disposed generally opposite the inboard end 30a in a transverse direction. As is conventional and shown in FIG. 7 for example, a fall protection cage 35 can be provided and has an inboard end 35a connected to the outboard end 30b of the gangway 30. Moreover, as shown in FIG. 4 for example, each gangway 30 is configured for pivotal movement of the outboard end 30b with respect to the inboard end 30a. FIG. 4 illustrates the operational mode of the apparatus 20 in which the gangway 30 is completely retracted as the gangway 30 is slidably moving within the trackway 24 down the length thereof, such movement being in the direction into and out of the view shown in FIG. 4 for example. Conversely, FIG. 7 illustrates the operational mode in which the apparatus 20 deploys a first gangway 30 from one side of the platform 22 and a second gangway 30 from the opposite side of the platform 22 in the fully extended mode so that each gangway 30 reaches the respective top 13a of a tank 13 that is to be accessed by workers walking from the platform 22 onto the respective gangway 30 and onto the top 13a of the respective tank 13, which is shown in phantom by the chain dashed outline. Moreover, as schematically shown in FIG. 7 for example, the outboard end 35b of each fall protection cage 35 is deployed over the work area on the top 13a of the tank 13. Also shown in chain dashed outline in FIG. 7 are the curved ladders 14 that provide access from each opposite side of the tank 13, the safety railing 15 at the top of the ladders 14 carried by the tank 13, and the service hatch 16 from which the cargo will be extracted from the tank 13 or loaded into the tank 13, as the case may be.

The details of the gangway 30 are varied and conventional and can be learned for example from the disclosures in U.S. Patent Application Publication Nos. 2012-0045274 and 2012-0042458, the disclosure of each of which being hereby incorporated herein for all purposes by this reference. As embodied herein and shown in FIG. 3 for example, the width of the gangway 30 is defined between a first side 31 of the gangway 30 and a second side 32 of the gangway 30 opposing the first side 31 of the gangway 30. As shown in FIG. 7 for example, the gangway 30 provides a walking surface 33 upon which workers can walk from the deck 22a of the platform 22 onto the top 13a of the tank 13. The operative orientation of the gangways 30 is shown in FIGS. 3 and 7 for example. As shown in FIG. 7 for example, the walking surface 33 extends generally horizontally in a transverse direction from the platform 22 to the top 13a of the tank 13 that is to be accessed by workers for inspection, loading or unloading. In its stored orientation shown in FIG. 4 for example, the gangway 30 and its walking surface 33 is pivoted above the platform 22 and disposed generally at a right angle with respect to the deck 22a of the platform 22.

As shown in FIGS. 4 and 7 for example, the walking surface 33 of the gangway 30 typically is bounded on each respective opposite side by a gangway railing that is indicated generally by the numeral 34. The gangway railing 34 desirably is configured so that it can fold and collapse onto itself to permit the gangway 30 at the user's option to be raised above the normal horizontal walking plane and lowered to dispose the walking surface 33 of the gangway 30 in a position suited for workers to move between the top 13a of the tank 13 and the deck 22a of the platform 22.

In accordance with the present invention, as shown in FIGS. 1, 2 and 10 for example, at least the upper flange of each stringer 23 defines a plurality of bolt openings 25. The spatial arrangement of the bolt openings 25 in each stringer 23 on each opposite side of the platform 22 desirably is the same, but can be different in some embodiments. Moreover, these arrangements of bolt openings 25 can be done in pairs or triplets or any other multiple grouping instead of as a single bolt opening 25, depending on the number of bolts needed to detachably anchor each of the modules of the platform railings and/or the gate modules 50. In the examples given below, groupings in pairs of bolt openings 25 will be used to explain this aspect of the present invention.

In the embodiment shown in FIGS. 1, 2 and 10, each grouping of bolt openings 25 includes two side-by-side bolt openings 25 wherein each bolt opening 25 is defined vertically through the upper flange 23a of the stringer 23. In this case, as schematically shown in FIG. 10 for example, the magnitude of the linear distance in the longitudinal direction between each pair of side-by-side bolt openings 25 of each grouping of bolt openings 25 is a gap that is generally designated by the upper case letter G. Moreover, this gap G between the bolt openings 25 in each grouping of bolt openings 25 desirably will be the same throughout each such grouping of bolt openings 25 of the stringer 23. A convenient reference point for measuring the distance that defines the gap G in the longitudinal direction between the pair of bolt openings 25 in a particular group of bolt openings 25 is the center of each bolt opening 25. However, whether the reference point for the measures of the gap G is chosen as the point equidistant between the bolt openings 25 of each grouping or a different reference point doesn't matter so long as the chosen reference point remains consistent. Additionally, while there are two side-by-side bolt openings 25 in the embodiment of the grouping of bolt openings 25 depicted in the drawings, a different number of bolt openings 25 in each grouping of bolt openings 25 is contemplated and could be for example three bolt openings 25 in each grouping or for example just a single bolt opening 25 in each grouping. Naturally, in the case of the single bolt opening 25 in the grouping of bolt openings 25, no gap would exist and G becomes zero and thus would be inapplicable, and the meaning of the term grouping in such an instance would default to a set with only one member.

In accordance with one embodiment of the present invention, there are two types of successive dual groupings of bolt openings 25 defined through the upper flange 23a of each stringer 23. Each type of successive dual groupings of bolt openings 25 is characterized by a different standard separation distance measured in the longitudinal direction. As schematically shown in FIG. 1 for example, one of the two types of successive dual groupings of bolt openings 25 defined in at least the upper flange 23a of the first stringer 23 is characterized by a relatively smaller spacing measured in the longitudinal direction between any successive groupings of bolt openings 25, and this relatively smaller spacing distance is denominated a first spacing and designated by the alphanumeric S1. Moreover, as shown in FIG. 1 each of these smaller first spacings S1 has the same magnitude. Additionally, as schematically shown in FIG. 1 for example, the other of the two types of successive dual groupings of bolt openings 25 defined in at least the upper flange 23a of the first stringer 23 is characterized by a relatively larger spacing measured in the longitudinal direction between any the successive groupings of bolt openings 25, and this relatively larger spacing distance is denominated a second spacing and designated by the alphanumeric S2. Moreover, as shown in FIG. 1 each of these larger second spacings S2 has the same magnitude. It should be noted that if only a single bolt suffices to anchor the posts of the railing modules or gate modules 50, then each grouping will be defined by a single bolt opening 25 that is separated by either the first spacing S1 or the second spacing S2.

Thus, as schematically shown in FIG. 1 for example, the distance measured in the longitudinal direction between the end groupings of bolt openings 25 of two successive groupings of bolt openings 25 of the second type of successive dual groupings of bolt openings 25 characterized by the larger second spacing S2 will have a magnitude that is a third spacing generally designated by the alphanumeric S3 that is equal to two times (twice) the second spacing S2 plus the first spacing S1, which is the separation distance between anchoring points of two side-by-side modules characterized by the unit spacing S2. In other words, 2×S2+S1=S3. Thus, as schematically shown in FIGS. 1 and 2 for example, the S3 magnitude is equal to a whole number multiple (2 in the case of FIG. 1) of the S2 magnitude plus the magnitude of the smaller spacing S1 that exists between the two successive groupings of bolt openings 25 that are separated by the larger spacing magnitude S2.

Conventional loading platforms include conventional side railings or fencing as well as swing gates that control worker access between the platform and the tops 13a of the tanks 13 for purposes of loading or unloading. Moreover, these conventional railings and swing gates are permanently welded to the conventional platform. However, instead of being permanently welded along the sides of the deck forming the elevated platform as in these conventional loading platforms, the platform railings in accordance with the present invention are broken up into modules of one or more standard lengths, and these railing modules in accordance with the apparatus 20 of the present invention are selectively, detachably bolted to the stringers 23 that form part of the trackways 24 disposed along the sides of the deck 22a of the platform 22 of the apparatus 21 of the present invention. Similarly, in accordance with the present invention, each gate module 50 (described more fully hereafter) that includes a barrier 52 pivotally connected to a gate post 51 desirably is configured with a longitudinal dimension that permits a degree of interchangeability with embodiments of the modules of the platform railings 40, 44 (described more fully hereafter). Moreover, in accordance with the present invention, embodiments of the modules of the platform railings 40, 44 are configured so that the longitudinal dimension of the largest module of the platform railings 40 is some whole number multiple of the longitudinal dimension of the smallest of the modules of platform railings 40 and/or the gate module 50 plus the separation distance S1 between the anchoring points of the side-by-side smallest modules.

As schematically shown in FIGS. 1 and 2 for example, any two side-by-side unit modules, be they embodiments of platform railing modules 44 or embodiments of the gate modules 50 or one platform railing module 44 adjacent to an embodiment of one gate module 50, can be interchanged with one of the larger platform railing modules 40 of the S3 magnitude measured in the longitudinal dimension. Moreover, it is this uniformity of the magnitudes of the spacings between the bolt openings 25 and the arrangement of the groupings of bolt openings 25 that permits a modular approach to the detachable attachment of the various fall protection components, which are described in more detail hereafter and that include for example the platform railing modules 40, 44 and embodiments of the gate modules 50.

As schematically shown in FIG. 1 for example, the apparatus 20 desirably includes at least a first platform railing module 40 that defines at least a first end post 41 and a second end post 42 that is spaced apart in the longitudinal direction from the first end post 41. Each of the end posts 41, 42 extends in a vertical direction and desirably can be connected by one or more horizontally elongated connecting rails 45. Each end post 41, 42 also has a vertically lower end that defines a foot flange 43. Each foot flange 43 defines a grouping of bolt openings 26, and these bolt openings 26 in the foot flange 43 are sized and spaced apart from one another in the same manner as each grouping of bolt openings 25 defined through the stringer 23. Moreover, the magnitude of the spacing in the longitudinal direction between the bolt openings 26 of each grouping of each foot flange 43 of each platform railing module 40 is the same first spacing G described above in relation each grouping of bolt openings 25 defined through the stringers 23. Additionally, the magnitude of the spacing in the longitudinal direction between the grouping of bolt openings 26 of the foot flange 43 of the first end post 41 and the grouping of bolt openings 26 of the foot flange 43 of the second end post 42 is a whole number multiple of the second spacing S2 plus the first spacing S1. For the platform railing module 40 in the embodiment shown in FIG. 1, that whole number multiplier is the number 2. Moreover, as shown in FIG. 2 for example, for a second type of platform railing module 44 that differs from the first platform railing module 40 by the different lengths of the connecting rails 45, the magnitude of the spacing in the longitudinal direction between the grouping of bolt openings 26 of the foot flange 43 of the first end post 41 and the grouping of the bolt openings 26 of the foot flange 43 of the second end post 42 desirably can be equal to the magnitude of the second spacing S2 alone. Thus, allowing for the longitudinal distances between each of the end posts 41, 42 of each type of platform railing module 40, 44, the bolt openings 26 in the foot flanges 43 of each platform railing module 40, 44, will align with and correspond to the bolt openings 25 in the upper flange 23a of the stringer 23.

As shown in FIGS. 1 and 2 for example, pluralities of threaded bolts 27 and mating threaded nuts 28 are provided. A threaded bolt 27 is selectively received through one of the respective bolt openings 26 of the foot flange 43 of one of the end posts 41 or 42 as well as through an aligned bolt opening 25 of the upper flange 23a of the stringer 23 so as to selectively attach that respective end post 41 or 42 of the platform railing module 40 or 44 via a respective threaded nut 28 that is tightened on the end of the respective threaded bolt 27. Similarly, a second threaded bolt 27 is selectively received through a respective bolt opening 26 of the foot flange 43 of the other end post 41 or 42 of the platform railing module 40 or 44 and successively through an aligned respective bolt opening 25 of the upper flange 23a of the stringer 23 to selectively attach the opposite end post 41 or 42 of the platform railing module 40 or 44 via a second threaded nut 28 that is tightened on the end of the second threaded bolt 27. In this way, each platform railing module 40 or 44 can be detachably connected to the platform 22 via the threaded nuts 28 attached to the threaded bolts 27. Moreover, removal of each platform railing module 40 or 44 is easily achieved by undoing the bolts 27 and nuts 28 without damaging either the platform 22, the platform railing module 40 or 44 or the bolts 27 and nuts 28. Thus, use of the apparatus 20 of the present invention easily accommodates different rail car configurations and different train configurations pulled up alongside of the platform 22 for loading or unloading.

As shown in FIGS. 6 and 8-10 for example, the apparatus further desirably can include a plurality of swing gate modules 50 that are detachably connected to the platform 22. As shown in FIGS. 1, 2 and 10 in particular for example, each gate module 50 is detachably connected to the upper flange 23a of the stringer 23 of the platform 22. As schematically shown in FIG. 3 for example, gate modules 50 desirably are configured and disposed so as to selectively control ingress and egress of workers between the deck 22a and one of the gangways 30. Alternatively, as explained more fully below, gate modules 50 also desirably are configured and disposed so as to selectively control ingress and egress of workers between the deck 22a and one of the emergency egress ladders 17 (e.g., FIGS. 6 and 10).

As shown in FIGS. 1, 2 and 10 for example, each gate module 50 desirably includes at least one gate post 51 and a gate barrier 52 that is pivotally connected to the gate post 51. Moreover, as shown in FIG. 10 for example, the pivotal connection between the barrier 52 and the gate post 51 desirably is effected by a spring-biased hinge connection 53 that biases the position of the barrier 52 in the closed position such as shown in FIGS. 1 and 2 for example. In the closed position, the gate module 50 desirably has its barrier 52 disposed so as to block passage of workers between the deck 22a and a gangway 30 or an emergency egress ladder 17 (e.g., FIGS. 6 and 10). In the closed position, the gate module 50 desirably has its barrier 52 disposed in alignment with the adjacent platform railing module 40 or 44. As shown in FIGS. 1, 2 and 10 for example, the barrier 52 of the gate module 50 desirably is provided with a stop flange 54 that prevents the spring-biased hinge connection 53 from moving the barrier past alignment with the adjacent platform railing module 40 or 44. However, as schematically shown in FIGS. 3, 8 and 10 for example, each gate module 50 desirably is configured so that the spring-biased hinge connection 53 permits the worker to pivot the barrier 52 manually in a manner to swing the barrier 52 inwardly toward the longitudinal centerline 21 of the deck 22a to open up worker passage between the deck 22a and a gangway 30 or an emergency egress ladder 17 (e.g., FIGS. 6 and 10).

As shown schematically in FIG. 1 for example, the gate post 51 of each swing gate module 50 extends in a vertical direction and has a vertically lower end that defines a foot flange 55. In an alternative embodiment shown in FIG. 10 for example, a single post serves as both the gate post 51 of the swing gate module 50 and an end post 42 of an adjacent platform railing module 44, and thus the gate post 51 and the end 42 post share a foot flange 43, 55. In each case, the foot flange 43, 55 defines a group of bolt openings 26, 56. The magnitude of the spacing in the longitudinal direction between the bolt openings 56 of the foot flange 55 of the gate post 51 is the same as the magnitude of the gap G in the foot flange 43 of the end posts 41, 42 of the platform railing module 40, 44 and thus the same as the gap G between the bolt openings 25 of the upper flange 23a of the stringer 23.

As schematically shown in FIG. 1 for example, the longitudinal extent of some embodiments of the gate module 50 desirably is one half of the longitudinal extent of one embodiment of the larger of the fixed railing modules 40. As schematically shown in FIGS. 2, 6 and 9 for example, the longitudinal dimension of some embodiments of the gate module 50 plus the longitudinal dimension of some embodiments of the smaller of the fixed railing modules 44 equals the longitudinal dimension of the larger of the fixed railing modules 40. Accordingly, some embodiments of each gate module 50 configured so that when aligned in succession with one of the smaller of the fixed railing modules 44, these two components of the apparatus 20 are be interchangeably detachably connected to upper flange of the stringer 23 with the larger of the fixed railing modules 40. Similarly, some embodiments of the gate modules 50 are configured so that when two of these embodiments of the gate modules 50 are aligned in succession they are interchangeably detachably connected to the upper flange 23a of the stringer 23 with the larger of the fixed railing modules 40.

As shown in FIGS. 4-6 and 10 for example, conventional platforms may be provided with one or more emergency egress ladders 17 that are rigidly fixed to the platform 22. As shown in FIG. 6 for example, each such emergency egress ladder 17 includes a plurality of rungs 18 disposed horizontally between a pair of opposing side rails 19 and successively in a vertical direction downwardly from the platform 22 to permit workers to escape from the platform 22 in an emergency situation. As shown in FIG. 10 for example, the top rung 18a of the emergency egress ladder 17 is disposed closest to the platform 22 among the plurality of rungs 18. The top rung 18a and the uppermost ends 19a of the side rails 19 of the fixed emergency ladder 17 are disposed beneath the platform 22 so as not to interfere with the passage of the gangway 30 sliding along the trackway 24 up and down the length of the platform 22. It is conventional therefore to provide a gate at the location of each of these fixed emergency egress ladders 17, and this gate is biased in the closed position that blocks passage from the deck 22a of the platform 22 to the top of the emergency ladder 17. Thus, in order to descend the emergency ladder 17, workers must open the gate disposed at the top of the ladder 17 and turn 180 degrees before stepping backwards with one foot to descend the ladder 17. However, in an emergency situation, each worker who is rushing to descend the fixed emergency egress ladder 17 must take care in assuring that the worker's first step makes contact with the upper rung 18a of the emergency ladder 17. Moreover, this first step must be taken in a direction that not only is descending from the platform 22 but also spaced apart in the transverse direction from the platform 22, thereby increasing the chances of a misstep, especially during an emergency in which the workers are in a hurry to leave the deck 22a of the platform 22 and descend the ladder 17 to reach the safety on the ground.

In accordance with the present invention as schematically shown in FIGS. 4-6 and 10 for example, embodiments of the apparatus desirably can include one or more ladder extension modules 60. As shown in FIG. 10 for example, each ladder extension module 60 is configured to be disposed in general alignment with the top of the emergency ladder 17 that extends vertically beneath the platform 22. As shown in FIGS. 4-6 for example, each ladder extension module 60 desirably is configured so as to be detachably connected to the platform 22. As shown in FIG. 10 for example, each ladder extension module 60 is desirably configured so as to be detachably connected to the upper flange 23a of the stringer 23 on one side of the deck 22a. However, a ladder extension module 60 desirably can be retrofitted to a pre-installed swing gate that is disposed to provide access to a fixed emergency egress ladder 17.

Moreover, as schematically shown in FIG. 10 for example, the longitudinal dimension of one embodiment of a ladder extension module 60 desirably is the same as the longitudinal dimension of three of the smaller of the fixed railing modules 44 or the longitudinal dimension of three of one of embodiments of the gate modules 50. Accordingly, one embodiment of a ladder extension module 60 is configured to be interchangeably detachably connected to the upper flange 23a of the stringer 23 in place of two of the smaller of the fixed railing modules 44 and one of one embodiment of the gate modules 50 in succession. Alternatively, one embodiment of a ladder extension module 60 is configured to be interchangeably detachably connected to the upper flange 23a of the stringer 23 in place of one of the larger of the fixed railing modules 40 and one of one embodiment of the gate modules 50 in succession.

As shown in FIG. 10 for example, each ladder extension module 60 desirably includes a pair of sidebars 61, 62, and a first sidebar 61 is longitudinally spaced apart from a second sidebar 62 that is disposed generally in parallel with the first sidebar 61. Furthermore, as shown in FIGS. 5 and 10 for example, each ladder extension module 60 desirably includes for each sidebar 61, 62, at least a first linkage 63 and desirably a plurality of linkages 63. As shown in FIG. 10 for example, each linkage 63 has one end pivotally connected to the sidebar 61 or 62 and a second end pivotally connected to the gate post 51 for the gate, whether it is the gate post 51 with the spring biased hinge or the gate post 41 of a railing module 40 or 44 that is disposed longitudinally spaced apart from the gate post 51 with the spring biased hinge 53.

As schematically shown in FIG. 5 for example, the pivoting movement of the sidebars 61 with respect to the linkages 63 renders the ladder extension module 60 selectively deployable between an extended mode and a retracted mode. In the view of FIG. 5, the retracted mode is indicated by the dashed outline, while the extended mode is indicated by the solid outline of the first sidebar 61 that is visible in the view of FIG. 5. When the ladder extension module 60 is deployed in the extended mode as schematically shown in FIGS. 5, 8 and 10 for example, the sidebars 61, 62 are disposed in the extended position. As schematically shown in FIG. 5 for example, the sidebars 61, 62 are disposed in a retracted position and folded against the gate post 51 or end post 41 or 42 (as the case may be) when the ladder extension module 60 is disposed in the retracted mode (dashed outline in FIG. 5). As shown in FIGS. 5 and 10 for example, in the extended mode, the respective sidebar 61 or 62 of the ladder extension module 60 is disposed spaced apart from the associated gate post 51, 41 or 42 by a distance that is substantially comparable to the length of one of the respective linkages 63. Moreover, as schematically shown in FIG. 4, when the ladder extension module 60 is disposed in the retracted mode, the sidebars 61, 62 are thus disposed in their retracted positions wherein each sidebar 61, 62 rests against the respective connected gate post 51 or end post 41 or 42. In the retracted mode schematically shown in FIG. 4, the ladder extension module 60 is configured so as to permit the gangway 30 to bypass the ladder extension module 60 as the gangway 30 slides longitudinally along the trackway 24.

As shown in FIG. 10 for example, each ladder extension module 60 includes a ladder rung 64 that is connected between the pair of sidebars 61, 62, and accordingly this ladder rung 64 is selectively deployable between an extended mode and a retracted mode along with the sidebars 61, 62. In retracted mode, the ladder rung 64 of each ladder extension module 60 is disposed close enough to the longitudinal centerline 21 of the deck 22a so as to allow each gangway 30 to bypass the ladder rung 64 as the gangway 30 moves slidably along the trackway 24.

When the ladder extension module 60 is deployed in the extended mode, the sidebars 61, 62 are disposed relatively farther away from the longitudinal centerline 21 of the deck 22a. As shown in FIG. 10 for example, when the ladder extension module 60 is deployed in the extended mode, the sidebars 61, 62 assume a disposition so that they are substantially vertically aligned with the upper ends 19a of the fixed emergency ladder 17. Moreover, as shown in FIG. 10 for example, when the ladder extension module 60 is deployed in the extended mode, the ladder rung 64 of the ladder extension module 60 is likewise disposed in vertical alignment with the ladder rungs 18a, 18b of the fixed ladder 17. Additionally, as shown in FIG. 10 for example, when the ladder extension module 60 is deployed in the extended mode, the disposition of the ladder rung 64 in the ladder extension module 60 desirably is disposed so that the vertical distance between the top rung 18a of the fixed ladder 17 and the rung 64 of the ladder extension module 60 is substantially the same as the vertical distance that separates at least the two uppermost rungs 18a, 18b of the fixed ladder 17. The vertical distance separating the uppermost two rungs 18a, 18b of the emergency egress ladder 17 is deemed to be substantially the same as the vertical distance between the top rung 18a of the emergency egress ladder 17 and the rung 64 of the ladder extension module 60 when the user of same is unlikely to notice any difference in vertical height during descent of the emergency ladder 17 via the ladder extension module 60. In this way, when the ladder extension module 60 is deployed in its extended mode, the ladder extension module 60 assumes a configuration that acts as an uninterrupted extension of the fixed emergency ladder 17, both as to the orientation of the sidebars 61, 62 with the side rails 19 of the emergency ladder 17 and the orientation of the ladder extension's rung 64 with the rungs 18 of the emergency ladder 17.

Because of these standardized length dimensions of the anchoring points of the modules 40, 44, 50, 60 and the commensurately standardized spacing of the bolt openings 25 along the upper flanges 23a of the stringers 23 in accordance with one aspect of the present invention, the same platform railing modules 40, 44, and swinging gate modules 50 can be selectively detached and moved to different locations along the platform 22 and positioned in different arrangements with respect to one another. Moreover, the same detachably interchangeable advantage is secured through use of the ladder extension module 60 in accordance with this aspect of the present invention.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus that provides selectively deployable worker access with fall protection to at least a portion of the top of a tank disposed above the ground and carried by a railcar on a railroad track, the apparatus comprising:
   a. an elevated platform extending in a longitudinal direction and defined in part by a deck having a pair of longitudinally extending sides that are separated apart from one another in the transverse direction, each side of the deck being disposed to a respective opposite side of a virtual longitudinal centerline that extends down the length of the platform and is oriented normal to the transverse direction;
   b. a pair of longitudinally extending stringers including a first stringer disposed along one side of the deck and a second stringer disposed along the opposite side of the deck, each stringer defining an upper flange extending along the length of the respective stringer and extending in the transverse direction;
   c. at least the first stringer defining a lower flange spaced vertically apart from the upper flange, the lower flange extending along the length of the first stringer and extending in the transverse direction, the upper and lower flanges of the first stringer forming part of a first trackway extending along the length of the first stringer;
   d. a first gangway having an inboard end disposed between the upper and lower flanges of the first stringer and slidably along the first trackway, the first gangway having an outboard end spaced apart from the inboard end in a transverse direction and configured for pivotal movement with respect to the inboard end;
   e. at least the upper flange of the first stringer defining a plurality of groupings of bolt openings wherein the magnitude of the spacing in the longitudinal direction between the bolt openings of each group is a first spacing and the magnitude of the spacing in the longitudinal direction between any two groups in succession along the length of the first stringer is a second spacing;
   f. a first railing defining at least a first end post and a second end post spaced apart in the longitudinal direction from the first end post, each of the end posts extending in a vertical direction, each end post having a vertically lower end defining a foot flange, each foot flange defining a separate group of bolt openings adjacent each and post wherein the magnitude of the distance in the longitudinal direction between the bolt openings of each separate group of each foot flange defines a gap and wherein the magnitude of the spacing in the longitudinal direction between the group of bolt openings of the foot flange of the first end post and the group of bolt openings of the foot flange of the second end post is the first spacing; and
   g. a plurality of threaded bolts and nuts wherein a first threaded bolt is selectively received through a respective bolt opening of the foot flange of the first end post and a respective bolt opening of the upper flange of the first stringer to selectively attach the respective first end post of the first railing via a respective first threaded nut tightened on the end of the respective first threaded bolt and wherein a second threaded bolt is selectively received through a respective bolt opening of the foot flange of the second end post and a respective bolt opening of the upper flange of the first stringer to selectively attach the respective second end post of the first railing via a second threaded nut tightened on the end of the second threaded bolt.

2. The apparatus of claim 1, further comprising a first gate detachably connected to the upper flange of the first stringer and configured to swing inwardly toward the longitudinal centerline of the deck.

3. The apparatus of claim 2, wherein each of the first railing and the first gate is configured so as to be interchangeably detachably connected to the upper flange of the first stringer.

4. The apparatus of claim 2, wherein the first gate is disposed so as to selectively control ingress and egress of workers between the deck and the gangway.

5. The apparatus of claim 2, wherein the first gate includes a first gate post and a first barrier pivotally connected to the first gate post, wherein the first gate post extends in a vertical direction and has a vertically lower end defining a foot flange defining a group of bolt openings, wherein the magnitude of the distance in the longitudinal direction between the bolt openings of the foot flange of the first gate post is the gap.

6. The apparatus of claim 5, further comprising a first ladder extension detachably connected to the upper flange of the first stringer and including a pair of longitudinally spaced apart sidebars, each sidebar configured to be pivotable between an extended position and a retracted position, wherein the first ladder extension includes a first linkage and a second linkage, at least the first linkage having one end pivotally connected to a first one of the sidebars and a second end pivotally connected to the first gate post, wherein pivoting movement of the sidebars with respect to the linkages renders the first ladder extension selectively deployable between an extended mode and a retracted mode, wherein in the extended mode the sidebars of the first ladder extension are disposed spaced apart from the first barrier by a distance substantially comparable to the length of the first linkage.

7. The apparatus of claim 6, wherein the first gate is disposed so as to selectively control ingress and egress of workers between the deck and the first ladder extension.

8. The apparatus of claim 1, further comprising a first ladder extension detachably connected to the upper flange of the first stringer and including a pair of longitudinally spaced apart sidebars, each sidebar configured to be pivotable between an extended position and a retracted position, wherein the retracted position disposes the sidebars so as to permit the gangway to bypass the first ladder extension when the gangway slides longitudinally along the first trackway.

9. The apparatus of claim 8, wherein the first ladder extension includes a ladder rung connected between the pair of sidebars and selectively deployable between an extended mode and a retracted mode, wherein in the extended mode the ladder rung is disposed farther away from the longitudinal centerline of the deck than is the disposition of the first stringer.

10. The apparatus of claim 8, wherein the first ladder extension includes a ladder rung connected between the pair of sidebars and selectively deployable between an extended mode and a retracted mode, wherein in the retracted mode the ladder rung is disposed close enough to the longitudinal centerline of the deck so as to allow the first gangway to bypass the ladder rung as the first gangway moves slidably along the first trackway.

11. The apparatus of claim 8, wherein the extended position of the sidebars of the first ladder extension disposes the sidebars relatively farther away from the longitudinal centerline of the deck and the retracted position of the sidebars of the first ladder extension disposes the sidebars relatively closer to the longitudinal centerline of the deck.

12. The apparatus of claim 8, further comprising an emergency egress ladder extending beneath the platform and disposed in alignment with the first ladder extension, the emergency egress ladder defining a plurality of rungs and including a top rung disposed closest to the platform among the plurality of rungs, the first ladder extension including a bottom ladder rung connected between the pair of sidebars and selectively deployable between an extended mode and a retracted mode, wherein in the extended mode the bottom ladder rung is disposed farther away from the longitudinal centerline than in the retracted mode and in vertical alignment with the top rung of the emergency egress ladder.

13. The apparatus of claim 12, wherein the vertical distance separating the uppermost two rungs of the emergency egress ladder is substantially the same as the vertical distance between the top rung of the emergency egress ladder and the bottom rung of the ladder extension when the ladder extension is disposed in the extended mode.

14. The apparatus of claim 12, wherein the emergency egress ladder includes a pair of side rails spaced apart from each other and carrying the plurality of rungs and wherein when the ladder extension is deployed in an extended mode, the ladder extension assumes a configuration that acts as an uninterrupted extension of the emergency egress ladder, both as to the orientation of the sidebars with the side rails of the emergency ladder and the orientation of the ladder extension's bottom rung with the top rung of the emergency egress ladder.

15. The apparatus of claim 1, further comprising a fall protection cage having an inboard end connected to the outboard end of the gangway.

16. The apparatus of claim 1, further comprising a plurality of rigid legs disposed to support the platform above the ground.

* * * * *